United States Patent
Schmidt et al.

(10) Patent No.: US 8,388,047 B2
(45) Date of Patent: Mar. 5, 2013

(54) VEHICLE BODY

(75) Inventors: Tim Schmidt, Bietigheim-Bissingen (DE); Jens Thomer, Nieder-Olm (DE); Wolfgang Niedecken, Stuttgart (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 134 days.

(21) Appl. No.: 12/551,708

(22) Filed: Sep. 1, 2009

(65) Prior Publication Data

US 2010/0096884 A1 Apr. 22, 2010

(30) Foreign Application Priority Data

Oct. 22, 2008 (DE) .......................... 10 2008 053 767

(51) Int. Cl.
*B62D 23/00* (2006.01)

(52) U.S. Cl. .............. 296/193.09; 296/203.02; 296/37.1

(58) Field of Classification Search .................. 224/539; 296/24.4, 37.1, 187.09, 193.09, 203.02; B62D 23/00; B62R 11/06
See application file for complete search history.

(56) References Cited

U.S. PATENT DOCUMENTS

| | | | |
|---|---|---|---|
| 2,998,280 | A | 8/1961 | Barenyi |
| 3,285,653 | A | 11/1966 | Komenda |
| 5,024,383 | A | 6/1991 | Vaschetto et al. |
| 5,500,985 | A * | 3/1996 | Klueger .......................... 16/354 |
| 2008/0178787 | A1 * | 7/2008 | Iwakami .................... 114/55.53 |

FOREIGN PATENT DOCUMENTS

| | | |
|---|---|---|
| DE | 385245 | 3/1988 |
| DE | 19811189 | 9/1999 |
| DE | 10309958 | 9/2004 |
| DE | 1032400 | 12/2004 |
| EP | 0 838 388 | 4/1998 |

* cited by examiner

*Primary Examiner* — Glenn Dayoan
*Assistant Examiner* — Jason S Daniels
(74) *Attorney, Agent, or Firm* — Gerald E. Hespos; Michael J. Porco

(57) ABSTRACT

A vehicle body has a front or rear end region with a luggage compartment and an accessories compartment. The luggage compartment is bounded in the vehicle longitudinal direction by a first and second partition walls. The accessories compartment is bounded in the vehicle longitudinal direction by the second partition wall and a third partition wall. The luggage and accessories compartments are bounded in the transverse direction by two lateral longitudinal members. A sealing frame closes off from above the first partition wall, the second partition wall and the longitudinal members from the first partition wall to the third partition wall.

9 Claims, 1 Drawing Sheet

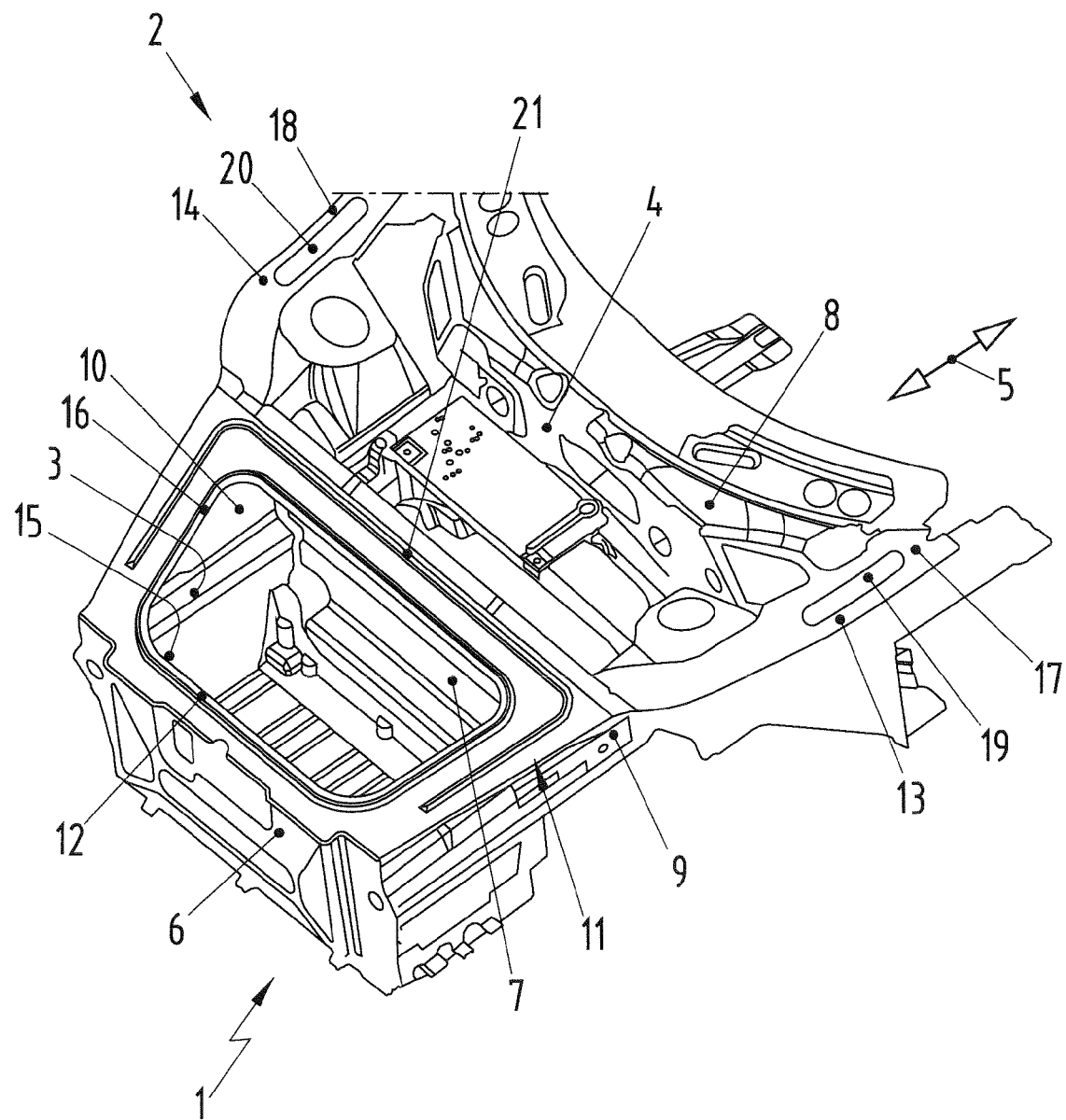

US 8,388,047 B2

VEHICLE BODY

CROSS-REFERENCE TO RELATED APPLICATIONS

This application claims priority under 35 USC 119 to German Patent Application No. 10 2008 053 767.5 filed on Oct. 22, 2008, the entire disclosure of which is incorporated herein by reference.

BACKGROUND OF THE INVENTION

1. Field of the Invention

The invention relates to a vehicle body, in particular of a passenger car.

2. Description of the Related Art

A front or rear end region of a vehicle body can have a luggage compartment, an accessories compartment and a passenger compartment that are separated from one another by partition walls. Such a configuration can be found, for example, in rear-drive vehicles that have the luggage compartment arranged in a forward structure of the vehicle body. The luggage compartment and accessories compartment can be closed by a hood. The accessories compartment can be designed as a wet compartment, whereas the luggage compartment should be a dry compartment that is sealed off from the environment when the hood is closed. Effective sealing of the luggage compartment can be complicated depending on the shape of the vehicle body.

EP 0 838 388 A1 discloses a self-supporting vehicle body for a passenger car. A vehicle body supporting structure in a region assigned to an accessories compartment and body parts of body paneling that surround this region of the vehicle body supporting structure are produced asymmetrically with respect to the center of gravity of the vehicle and are made at least in part of a material having a reduced weight relative to the remainder of the vehicle body supporting structure and relative to the remainder of the body paneling.

The invention was made in view of the above-described problems and an object of the invention is to provide a vehicle body of the type mentioned above that can achieve effective luggage compartment sealing in a comparatively simple manner.

SUMMARY OF THE INVENTION

The invention is based on the general idea of equipping a vehicle body with a sealing frame designed to close off a first partition wall that bounds the luggage compartment on a side remote from the accessories compartment, a second partition wall that separates the luggage compartment from the accessories compartment and a third partition wall bounds the accessories compartment on a side remote from the luggage compartment. Lateral longitudinal members laterally bound the luggage compartment and the accessories compartment from the first partition wall to the third partition wall. The vehicle body also has a sealing frame designed to bound at least the luggage compartment from above. The sealing frame is a single component that can be engaged by and sealed to a hood for closing the luggage compartment and the accessories compartment. The sealing frame can have a particularly simple sealing contour, thus simplifying the sealing and increasing the effectiveness of the seal.

The sealing frame preferably forms a closed structure, thus simplifying the formation of an effective seal for the luggage compartment.

A sealing surface preferably surrounds the luggage compartment in a closed continuous manner. Thus, a seal can be provided on the sealing surface and can surround the luggage compartment in a closed continuous manner. The seal interacts with a hood that closes the luggage compartment and the accessories compartment. A closed, uninterrupted encircling seal or sealing surface can achieve a high sealing action and at the same time can be produced comparatively inexpensively. Hinge carriers can be arranged on the sealing frame for fastening a hinge to mount a hood that closes the luggage compartment and the accessories compartment. The hinge carriers can define preset zero points for the mounting the hood.

The sealing frame can have fastening locations for lateral vehicle panels, such as fenders. The fastening locations can define preset zero points for mounting the lateral vehicle panels, in particular the fenders.

The sealing frame may have fastening locations for an add-on part that connects to the first partition wall. The fastening locations also can define preset zero points for the mounting of an add-on part.

The preset zero points formed on the sealing frame can in each case be embodied alternatively, cumulatively or in any desired combination and can be used to simplify vehicle assembly considerably. In a conventional procedure, the side doors are mounted and adjusted after the production of the vehicle body. The fenders then are mounted and must be adjusted in a complicated manner to be able to set predetermined gap sizes. The hood then is mounted and adjusted in a complicated manner to set predetermined gap sizes. Finally, the respective add-on part then is mounted and adjusted in a complicated manner to set predetermined gap sizes. By contrast, the sealing frame of the subject invention forms a closure of the body and can be mounted on the body to adopt a predetermined relative position with respect to preset zero points which provided on the body for mounting the side doors. The lateral panels, the hood and the respective add-on part then can be fastened at the preset zero points on the sealing frame. Thus, the invention makes it possible to bypass a tolerance chain that necessarily forms during the production of the vehicle body in the case of fastening locations not formed on the sealing frame. When the sealing frame is mounted in the correct manner, the cladding parts mounted thereon, namely in particular the hood, the fenders or other lateral panels and the respective add-on part, automatically have a predetermined relative position. As a result, the predetermined gap sizes already are substantially present so that no adjustment measures, or only minor adjustments, are required. Thus, the sealing frame significantly simplifies vehicle production while maintaining high manufacturing quality.

Further important features and advantages of the invention will become apparent from the drawing and from the associated description of the figures with reference to the drawing. The features mentioned above and explained below can be used in the combination indicated and also in other combinations or on their own without departing from the scope of the invention.

BRIEF DESCRIPTION OF THE DRAWING

FIG. 1 is a perspective view of a vehicle body in the region of a sealing frame.

DETAILED DESCRIPTION OF THE PREFERRED EMBODIMENT

A vehicle body in accordance with the invention is identified by the numeral 1 in FIG. 1. The vehicle body 1 comprises a luggage compartment 3 and an accessories compartment 4 in the region of a rearward structure or rear end region, or in the case of the embodiment shown, at a front end region 2. The terms "front" and "rear" relate to a vehicle longitudinal direction 5 indicated by a double arrow or to a relative position with respect to the direction of travel of the vehicle when it is moving forward. In this respect, the luggage compartment 3 is arranged in front of the accessories compartment 4 in the example. The body 1 preferably is for a passenger car with a rear engine. The terms "above" and "below" relate to the customary situation in the finished vehicle.

In the illustrated, the luggage compartment 3 is bounded to the front by a first partition wall 6 and is bounded to the rear by a second partition wall 7. The accessories compartment 4 is bounded in the vehicle longitudinal direction 5 by the second partition wall 7 and a third partition wall 8. In the illustrated embodiment, the accessories compartment 4 is bounded to the front by the second partition wall 7 and to the rear by the third partition wall 8. The body 1 also comprises first and second lateral longitudinal members 9 and 10 that extend substantially parallel to the vehicle longitudinal direction 5 and that laterally bound both the luggage compartment 3 and the accessories compartment 4.

The luggage compartment 3 conventionally serves to accommodate items of luggage and therefore preferably is designed as a dry compartment that is sealed off from the vehicle surroundings. By contrast, the accessories compartment 4 is designed to accommodate various accessories and can expediently be configured as a wet compartment so that moisture from the vehicle surroundings, in particular from below, can enter the accessories compartment 4. For example, the accessories compartment 4 is designed to be open to the bottom. The accessories compartment 4 may accommodate components of a vehicle steering system, components of a drive train, a vehicle battery and independent wheel suspensions.

The body 1 also has a sealing frame 11 that is configured to cover top ends of the first partition wall 6, the second partition wall 7, and the first and second longitudinal members 9, 10 from the first partition wall 6 to the third partition wall 8. Thus, the sealing frame 11 forms an upper closure for the partition walls 6, 7 and longitudinal members 9, 10 and enables a uniform, continuous contour that is independent of production tolerances of the components of the body 1 which are arranged below. Hence, the sealing frame 11 considerably simplifies the provision of effective sealing of the luggage compartment 3 with respect to a hood (not shown here) for closing the luggage compartment 3 and the accessories compartment 4.

The sealing frame 11 preferably forms a closed continuous structure that does not contain any interruptions. For this purpose, the sealing frame 11 can have a frame part 12 and first and second side parts 13 and 14 added thereon. The frame part 12 forms an upper closure for the first partition wall 6, the second partition wall 7 and each of the first two longitudinal members 9, 10 from the first partition wall 6 to the second partition wall 7. The first side part 13 forms an upper closure for the first longitudinal member 9 from the second partition wall 7 to the third partition wall 8. The second side part 14 forms an upper closure for the second longitudinal member 10 from the second partition wall 7 to the third partition wall 8. The frame part 12 and the two side parts 13, 14 each can be produced separately as shaped sheet metal parts from a piece of sheet metal.

The frame part 12 forms a closed continuous encircling border for the luggage compartment 3 and accordingly has a closed encircling inner peripheral edge 15. A closed encircling sealing surface is formed on the inner edge 15 for providing sealing between the sealing frame 11 and the hood. The sealing surface can interact with a seal formed on the hood. However, preference is given to the illustrated embodiment in which an annular and closed encircling seal 16 made of a suitable elastic sealing material is applied to the inner edge 15. For example, the seal 16 can be pushed onto the inner edge 15 interacts with a corresponding sealing surface on the hood to seal off the luggage compartment 3.

Portions 17 and 18 of the sealing frame 11 are adjacent to the third partition wall 8 are provided respectively with a hinge carrier 19 and 20. Hinges (not shown) can be mounted to the hinge carriers 19, 20 for hingedly mounting the hood on the body 1. In the example, the portions 17, 18 are situated on the side parts 13, 14. The hinge carriers 19, 20 here define fastening locations for the hood and can serve as a preset zero point for hood fastening.

A plurality of separately produced individual parts are joined together to assemble the vehicle body 1, and in the process, production tolerances add up to form tolerance chains. Cladding parts (e. g. fenders, hood) are fastened to the body 1, and associated fastening locations on the body 1 are subject to tolerance chains. As a result, complicated adjustments of cladding parts are necessary to achieve a predetermined joint pattern between adjacent cladding parts. The sealing frame 11 and the fastening locations provided on the sealing frame 11 enables tolerance chains to be avoided while mounting cladding parts on the sealing frame 11. More particularly, the fastening locations on the sealing frame 11 are oriented to define preset zero points situated at the start of the tolerance chains. For example, the sealing frame 11 can be adjusted relative to the third partition wall 8 or relative to preset zero points in the region of the third partition wall 8 as the sealing frame 11 is being mounted. The preset zero points are used to adjust the sealing frame 11 and simultaneously serve, for example, as preset zero points for fastening side doors to the vehicle body 1. The hood subsequently mounted on the sealing frame 11 and automatically has a predetermined relative position with respect to the side doors without requiring a complicated adjustment of the hood relative to the side doors.

In addition or as an alternative to the fastening locations 19, 20 for the hood, the sealing frame 11 can have fastening locations, which are not described in more detail here, for lateral vehicle panels, such as front or rear fenders, for example. When applying the vehicle cladding or body cladding, the lateral vehicle panels, such as the fenders, can then be mounted at these fastening locations. These fastening locations also expediently are embodied as a preset zero points. Thus, the lateral vehicle panels mounted on the sealing frame 11 automatically have the desired relative position with respect to the hood and/or with respect to the side doors.

In addition or as an alternative, the sealing frame 11 can have further fastening locations, which are not described in more detail, for an add-on part that connects to the first partition wall 6. In the case of the forward structure 2 shown, such an add-on part is, for example, a nose section of the vehicle. For example, the nose section may comprise a front bumper. When assembling the vehicle, the respective add-on parts, for example the nose section, can then be mounted on the sealing frame 11 at the fastening locations. These fastening locations also can be preset zero points, so that the add-on part mounted on the sealing frame 11 has the desired relative position with respect to the hood and/or with respect to the lateral vehicle panels without complicated adjusting measures being required.

The sealing frame 11 equipped with fastening locations that are embodied as preset zero points for cladding elements or add-on parts results in a significant simplification of the production of the vehicle constructed with the body 1.

In the exemplary embodiment represented, the sealing frame 11 features a bead-like depression 21 having a U shape in plan view that serves to reinforce the frame part 12 of the sealing frame 11.

What is claimed is:

1. A vehicle body with an end region, a luggage compartment and an accessories compartment at the end region, the luggage compartment being bounded in a vehicle longitudinal direction by first and second partition walls, the accessories compartment being bounded in the vehicle longitudinal direction by the second partition wall and by a third partition wall, the luggage compartment and the accessories compartment being bounded in a vehicle transverse direction by first and second lateral longitudinal members, and a sealing frame mounted from above on top ends of the first partition wall, the second partition wall and the longitudinal members from the first partition wall to the third partition wall, the sealing frame having a continuous closed encircling frame part mounted from above on top ends of the first partition wall, the second partition wall and the longitudinal members from the first partition wall to the second partition wall and having a continuous encircling sealing face facing away from the first partition wall, the second partition wall and the longitudinal members and surrounding the luggage compartment, the sealing frame further including first and second side parts unitary with the frame part, the first and second side parts being mounted from above to the respective first and second longitudinal members from the second partition wall to the third partition wall, each of the side parts having preset zero points for fastening at least one add-on part to the sealing frame during assembly of the vehicle.

2. The vehicle body of claim 1, further comprising a seal mounted to the sealing surface of the sealing frame for sealing off a hood that closes the luggage compartment and the accessories compartment.

3. The vehicle body of claim 2, wherein the seal extends continuously around the luggage compartment.

4. The vehicle body of claim 1, wherein the preset zero points include hinge carriers at portions of the sealing frame adjacent to the third partition wall for fastening a hinge to mount a hood for closing off the luggage compartment and the accessories compartment.

5. The vehicle body of claim 1, wherein the luggage compartment and the accessories compartment are formed in a forward structure of the vehicle body.

6. The vehicle body of claim 5, wherein the vehicle is a passenger car with a rear engine.

7. A vehicle body of a rear engine passenger car, the vehicle body having a front end region formed with a luggage compartment and an accessories compartment rearward of the luggage compartment, the luggage compartment having an open top, a closed bottom and being bounded in a vehicle longitudinal direction by first and second partition walls, the accessories compartment having an open top, an open bottom and being bounded in the vehicle longitudinal direction by the second partition wall and by a third partition wall, the luggage compartment and the accessories compartment being bounded in a vehicle transverse direction by first and second lateral longitudinal members, and a sealing frame formed as a single component of sheet metal with a continuous frame part mounted to top ends of the first partition wall, the second partition wall and at least portions of the longitudinal members from the first partition wall to the second partition wall, the sheet metal of the frame part having a sealing surface facing away from the first partition wall, the second partition wall and the longitudinal members and extending continuously around the open top of the luggage compartment, the sealing frame further including first and second side parts mounted from above to the respective first and second longitudinal members from the second partition wall to the third partition wall, each of the side parts having preset zero points for at least one add-on part that is fastened to the sealing frame during the assembly of the vehicle.

8. The vehicle body of claim 7, further comprising a seal mounted to the sealing surface of the fame part and extending continuously around the luggage compartment.

9. The vehicle body of claim 7, wherein portions of the sealing frame adjacent to the third partition wall has at least one hinge carrier for fastening a hinge to mount a hood for closing off the luggage compartment and the accessories compartment.

* * * * *